United States Patent

Prigal

[15] 3,678,149
[45] July 18, 1972

[54] METHOD OF ENHANCING THE ACTION OF A MEDICAMENT

[72] Inventor: Samuel J. Prigal, 225 West 106th St., New York, N.Y. 10025

[22] Filed: Jan. 26, 1970

[21] Appl. No.: 5,950

Related U.S. Application Data

[63] Continuation-in-part of Ser. No. 490,642, Sept. 27, 1965, Pat. No. 3,492,399, which is a continuation-in-part of Ser. Nos. 170,242, Jan. 31, 1962, abandoned, and Ser. No. 401,669, Oct. 6, 1964, abandoned, which is a continuation-in-part of Ser. No. 47,364, Aug. 4, 1960, abandoned, and Ser. No. 28,011, May 10, 1960, Pat. No. 3,096,249.

[52] U.S. Cl..........................424/8, 424/7, 424/88, 424/89, 424/91, 424/92, 424/180
[51] Int. Cl. ..........................................A61k 27/12
[58] Field of Search .....................424/88–91, 7, 8

[56] References Cited

UNITED STATES PATENTS

| | | | |
|---|---|---|---|
| 3,096,249 | 7/1963 | Prigal | 424/35 X |
| 3,149,036 | 9/1964 | Woodhour et al. | 424/88 X |
| 3,185,625 | 5/1965 | Brown | 424/22 X |
| 3,384,544 | 5/1968 | Walton et al. | 424/89 X |
| 3,399,263 | 8/1968 | Strazdins et al. | 424/88 |
| 3,492,399 | 1/1970 | Prigal | 424/91 |
| 3,531,565 | 9/1970 | Webb et al. | 424/92 |

OTHER PUBLICATIONS

Loveless J. Immunol. 79(1):68–79 July 1957 Repository Immunization in Pollen Allergy
Brown Annals of Allergy 17:34–49 Jan.–Feb. 1959. The Treatment of Pollinosis by Means of a Single Injection of Emulsified Extract V. Preparation, Standardization and Administration
Brown Review of Allergy and Applied Immunology 14:302–347 May–June 1960 Opsiphylactic Injection Treatment of Grass Hay Fever and Pollen Asthma
Prigal New York State J. Med 61:3,616–3,623 Nov. 1961 Improved Emulsions of Allergens With Built-In Safety Features

*Primary Examiner*—Shep K. Rose
*Attorney*—Donald P. Gillette

[57] ABSTRACT

This invention is concerned with a method of prolonging the action of a medicament in a mammal by administering parenterally thereto an emulsion comprising an aqueous phase dispersed substantially uniformly throughout a metabolizable vegetable, animal or hydrocarbon oil containing one or more hydrocarbons of about 12 to 18 carbon atoms, the aqueous phase having an average particle size of about 0.1 to 10 microns and including an effective dose of a medicament. The medicament may be therapeutic or prophylactic in nature, and more specifically, may include live or killed microorganisms, pollen extract and a host of other materials.

In another aspect of the invention non-specific resistance of the mammal is induced by administering parenterally the aforedescribed emulsion in which the medicament is a lipopolysaccharide and such an emulsion induces in the mammal resistance to radiation, shock and infection when subjected thereto. In a specific sense the fetus of a mammal may derive higher resistance to infection or radiation by administration to the female mammal the aforedescribed emulsion.

The oil phase of the emulsion decreases the $LD_{50}$ of a toxic medicament.
The mammals in which such responses can be achieved are mice, rabbits, monkeys, rats, guinea pigs, pigs, dogs, and the like.

6 Claims, No Drawings

METHOD OF ENHANCING THE ACTION OF A MEDICAMENT

BACKGROUND OF THE INVENTION

This application is a continuation-in-part of my co-pending application Ser. No. 490,642 filed Sept. 27, 1965, now U.S. Pat. No 3,492,399 which was a continuation-in-part of my applications Ser. No. 170,242 filed Jan. 31, 1962 and Ser. No. 401,669 filed Oct. 6, 1964, both now abandoned, which were continuations-in-part of my application Ser. No. 47,364 filed Aug. 4, 1960, now abandoned, and of my U.S. Pat. No. 3,096,249, which issued July 2, 1963 on application Ser. No. 28,011 filed May 10, 1960.

FIELD OF THE INVENTION

This invention relates to methods of prolonging the action of medicaments through prolonged release by having such medicament contained within an aqueous phase dispersed in a vegetable, animal or hydrocarbon oil containing about 12 to 18 carbon atoms. The same actions can be employed to induce non-specific resistance in a mammal through the prolonged release of a toxicant, such as a lippolysaccharide.

BACKGROUND OF THE INVENTION

In the production of immunity in mammals, whether against infectious diseases or in the treatment of allergic disorders, the use of the water-in-oil type emulsion with the oil phase of the present invention as an adjuvant, has proved remarkably effective. Antibody production of a higher order and of prolonged duration can be achieved in this fashion, as exemplified by the administration of influenza vaccine, in which multiple aqueous injections provide immunity for about one year, whereas the same vaccine given as an emulsion provides at least nine years protection. Weak antigens administered in this fashion have also been shown to possess an increased level of effectiveness.

These and the other objects of this invention are accomplished by employment of a water-in-oil emulsion comprising an aqueous phase dispersed substantially uniformly throughout a metabolizable vegetable, animal or hydrocarbon oil including one or more hydrocarbons containing between about 12–18 carbon atoms, the aqueous phase having an average particle size of about 0.1 to 10 microns, and containing a prophylactic or therapeutic agent which does not produce hypersensitivity.

The therapeutic and prophylactic agents of this invention useful in mammals are those which induce prolonged therapy or prolonged immunity. This is a most significant feature of this invention. Illustrative of such therapeutic and prophylactic agents are the agents which can be employed for the purpose of this invention and which are not soluble in the oil phase. The agent may be insoluble in water or completely soluble therein or it may be intermediate of such solubilities, but it cannot be soluble in oil, otherwise it will not be entrapped as part of the aqueous phase within the oil phase. The agent may include allergens, e.g., house dust extract (Center), house dust extract (Endo) lyophilized or aqueous, tree pollen, timothy pollen, plantain pollen, ragweed pollen, molds, epidermals, etc.; poison ivy; anesthetics, e.g., procaine, hydrochloride, etc.; antibiotics, e.g., procaine potassium penicillin G (suspension), tetracycline, chloramphenicol, oxytetracycline, nitrofuran, etc.; antimethabolites antihistamines, e.g., diphenydramine hydrochloride, tripelennamine hydrochloride; chlorprophyenpyridamine, etc.; antienzyme, e.g., enostigmine, etc.; anticoagulent, e.g., heparin, etc.; antiinflammatory agent, e.g., phenylbutazone, 3-5-dioxo-1, 2-diphenyl-4-n-butyl pyrazolidine, etc.; bronchodilators, e.g., epinephrine, isopropylarterenol, ethylnorepinephrine hydrochloride, protokylol hydrochloride, etc.; coagulant, e.g., medadione sodium bisulfite, etc.; diuretics, e.g., mercumatilin, mercaptomerin, sodium meralluride-theophylline, etc.; enzymes, e.g., chymotrypsin crystallized trypsin, etc.; hormones, e.g., insulin, globulin insulin, sodium succiate ester of hydrocortisone, ACTH (corticotrophin), corticotropin zinc, methicortelone, methylprednisolone acetate, pituitrin, etc.; stimulants, e.g., caffeine sodium benzoate, nikethamide, etc.; tranquilizers, e.g., chlorpromazine, methaminodiazepoxide, etc.; vaccines, e.g. typhoid (triple), influenza, polimyelitis, staphylococcus toxoid, etc.; vitamins, e.g., ascorbic acid, vitamin B complex, vitamin $B_{12}$, vitamin B, etc. The quantity of agent which is incorporated in the aqueous phase may vary considerably in view of the nature of the material employed and the purpose of use but, in general, the amount employed may be about 1.5 to 10,000 times greater or even higher than is used conventionally for purposes of inoculation.

Within the scope of this invention and forming an embodiment thereof is a method for inducing non-specific host resistance by the parenteral administration of an emulsion, as defined hereinbefore, wherein said emulsion contains an effective dose of a lipopolysaccharide, so that the host upon exposure to radiation, shock (traumatic, hemorrhagic, allergic, gravitational, vibrational, and burn), and infection (bacterial, rickettsial, protozoan, viral — naturally and artificially encountered), exhibits resistance thereto.

As has been discussed above, the water-in-oil emulsion of this invention enable the administration of relatively toxic doses of allergins to hypersensitive mammals with safety. The same modality can therefore be applied to primary toxic agents, such as bacterial endotoxin, so that presumably lethal doses do not kill when injected. Furthermore, abundant evidence is available that lipopolysaccharides (LPS) derived from bacterial endotoxin induce in experimental animals multiple favorable responses, enabling them to withstand a variety of noxious challenges as discussed hereinabove. The following examples demonstrate the induction of resistance in mice against a lethal Staphylococcus infection, Sarcoma (180) implant and against a whole-body X-irradiation.

EXAMPLE I 88 parts of n-hexadecane, 10 parts purified mannide mono-oleate and 2 parts glyceryl mono-oleate were combined. An aqueous phase was prepared by suspending solid LPS derived from E. coli 026:B6 and prepared by the Bouivin method in sterile pyrogen-free distilled water in a concentration of 20 and 40 mg/ml. To each ml. was added one drop (0.5cc) of $FeCl_3$(10ercent). The aqueous LPS suspension was emulsified with the oil mixture under sterile conditions in batches of 6–8 ml., using equal portions of the oil and aqueous phases. 5 minutes of shaking in an electrical shaker which moves in three distinct planes, at about 3,000 r.p.m., was used for emulsification.

When the LPS is emulsified, it is possible to give 2–4 times the $LD_{50}$ dose, without killing, for prolonged effect. (This is demonstrated fully hereinafter). Thus, 2mg. of LPS as a parenteral aqueous injection kills 100 percent of all mice to which it is administered within 72 hours. However, when the same dose is emulsified, as above, upon injection 100 percent survival can be achieved. Mammals thus treated can withstand challenges against Sarcoma implant, irradiation and infection. For example, in one study 1 mg. of emulsified LPS injected sub-cutaneously into 60 mice and challenged at 2, 14, 21, 36 50 and 70 days with a lethal staphylococcus injection of the protective LPS emulsion yielded survivors ranging from 90–20 percent with an over-all percent survival of 53.8 percent. In sharp contrast, 30 mice unprotected by the LPS showed no survivors when challenged by the staph infection. In another study of 60 mice in which 2 mg. of LPS was injected sub-cutaneously as an emulsion, the percent survival, when challenged with a staph infection, was 46.6 percent. In both cases, the control group showed 100 percent mortality.

LPS treated mice were also challenged with a Sarcoma (180) implant, which normally kills 80–90 percent of the animals so treated. The LPS protected group, however, showed survival rates ranging from 30–80 percent, and this type of resistance was detectable for as long as 92 days after the initial LPS injection.

Yet another group of mice protected by LPS was exposed to lethal whole-body radiation (680r). These mice resisted the lethal action and increased survival was noted for a minimum of 23 days, with the survival rate being 20 percent at 2 days (post LPS parenteral injection), 29 percent at 5 days, 33 percent at 14 days and 27.8 percent at 23 days. In marked contrast, the survival rate of untreated mice exposed to the same radiation dose was only 16.6 percent.

A related embodiment and one which demonstrates a significant advantage of this invention, is a method for decreasing the $LD_{50}$ of a therapeutic or prophylactic agent which comprises the incorporation of said agent in the metabolizable oils of this invention as a water-in-oil emulsion wherein the aqueous phase contains 0.1–10 micron-size particles. Through such incorporation, it is possible to utilize prophylactic or therapeutic agent materials which heretofore were too toxic to be employed in sufficiently large dosage unit form to achieve a desired effect without endangering the mammal. Exemplary of agents which are particularly important in this regard are the pharmaceutically important polysaccharides (zymosan, glucan and bacterial endotoxins or lipopolysaccharides). Also exemplary are large dosages of such common allergens as extracts of the pollen or ragweed, timothy and plantain, house dust and epidermals administered in dosage units which would usually be toxic unless emulsified in the above-described hydrocarbon oils.

Utilization of the novel emulsions of this invention produces an increased repository effect which results in prolongation of the action of the therapeutic or prophylactic agent contained therein. For example, lipopolysaccharide (LPS), even if given in less than $LD_{50}$ dose, still exerts some toxic effect and the sum total of its therapeutic benefit is only for short duration — a matter of several days to a week. On the other hand LPS given 2–4 times the $LD_{50}$, in the form of a water-in-oil emulsion of this invention, exerts prolonged effect against a Sarcoma implant (over 90 days). Against an intravenous injection of live staphlococci, an effect for 77 days is observed, and over 23 days against lethal whole-body radiation. These results are achieved, furthermore, without killing, despite the administration of doses which are normally lethal doses. Therefore, another embodiment of this invention is a method for achieving such prolongation of therapeutic effect, comprising the administration to the mammal of a water-in-oil emulsion, as defined hereinbefore.

In connection with the production of resistance through utilization of the foregoing LPS emulsions, a method for producing resistance of the fetus to infection or radiation by administration parenteral to the pregnant female mammal of an emulsion of this invention containing an effective amount of a lipopolysaccharide forms an embodiment of this invention. This embodiment is of great significance, for example, in the diagnosis or treatment of pregnant female mammals where use of any form of radiation has, in the past, been limited in view of the unusual sensitivity of the fetus to radiation.

Another embodiment of this invention comprises a method for modifying and purifying pollen antigens by the incorporation of an effective amount, generally about 0.05–0.0 ml. of a solution of heavy metal salt, generally up to about 10 percent by weight, such as iron salts, as for example, ferric chloride, into each ml. of allergen extract in an emulsion of this invention, wherein the therapeutic or prophylactic agent contained therein is pollen extract. Current methods of hyposensitization of pollenosis, wherein there is sensitivity to various pollens, the classic example of which is ragweed hayfever, continue to be inadequate, presumably due to the interference with antibody production by some of the extraneous allergens of the pollen.

In connection with this embodiment, the pH of the aqueous phase is significant and it is preferred to achieve a pH of the allergen extracts on the acid side. For example, in the range of between about a pH of 1–5 and preferably 2–4. Therefore, another embodiment of this invention is a method for modifying and purifying pollen antigens comprising acidification of a water-in-oil emulsion, as defined hereinabove, to achieve the foregoing pH ranges. Within the scope of this embodiment also is the novel modified pollen antigen produced by the ferric chloride in the foregoing manner.

It has been the practice to immunize some allergic mammals by a series of sub-cutaneous injections, beginning with small doses of allergen and gradually increasing the dosage at weekly intervals, until satisfactory immunization was achieved. Usually it requires approximately 20 injections to immunize a mammal against hay fever or asthma due to pollen, dust or mold sensitivity. The administration of the allergen or antigen may produce untoward effects, if care is not exercised in regulating the quantity of the antigen. In the case of aqueous extracts of antigens, immediate reactions, such as hay fever (allergic rhinitis), hives, asthma and/or shock, may occur, if the quantity of the antigen exceeds the tolerance of the mammal.

Through extensive investigations, it has been determined that the dangers which may arise from wrong diagnosis of a mammal's tolerance can be substantially eliminated by using the allergen in a form which will be released in small quantities at a slow rate at the site of injection. Actually, the rate of release and assimilation is such that the mammal need only be given a single injection (or a few injections), in contrast to the 20 or so injections now being widely used. The technique by which this revolutionary change is made possible will be discussed in greater detail hereinbelow.

In accordance with the present invention, the allergen is admixed with a polyvalent metallic ion in quantities sufficient to combine chemically with at least part of the proteinaceous material contained therein; and then the allergen thus treated is emulsified within a non-toxic oil of this invention.

In a more particular aspect of the present invention, the metallic ion is admixed with the allergen in a quantity greater than that required to combine chemically with all of the proteinaceous material and the excess is usable as an indicating material to designate the state of emulsification, thus indicating whether it is safe to use.

Still another embodiment of this invention is a method for producing specific immunity by the administration of the emulsion of this invention wherein the therapeutic agent is a live, virulent or attenuated organism.

In reference to the use of live microorganisms in emulsions, it is known that killed vaccines do not always produce immunity. On the other hand, immunity may be achieved by the use of live organisms, usually attenuated. This creates in turn the possibility of overwhelming the host with infection. When, however, these live organisms are given as a water-in-oil emulsion for slow release, it is possible to produce immunity without overwhelming the defenses of the mammal. In essence, this is how most immunity is achieved, by natural exposure to small doses of live organisms which may produce subclinical disease and immunity. Thus, a method for producing specific immunity by the parenteral administration of live organisms as the water-in-oil emulsion of this invention forms an embodiment of this invention. In general, the natural virulent form of the organism is preferred, although attenuated and even the killed organism can also be employed. In the case of the killed organism, a more effective and prolonged immunity can be achieved.

This embodiment thus is concerned with a water-in-oil emulsion wherein the dispersed aqueous phase contains a microorganism, which for the present purpose may mean in a generic sense killed, attenuated or a virulent organism. In a more particular sense, the emulsion can contain a polyvalent metal cation which serves to enhance its stability. The adjuvant oil, as defined herein, exerts a therapeutic effect by virtue of the effect it has on the reticulo endothelial system, (abbreviated as the "RES"hereinafter). This is a surprising beneficial effect, because when the RES is stimulated, the response to an antigen for development of specific immunity is greater than would be otherwise.

The discovery that the oil has a therapeutic effect through its stimulation of the RES is important, because it points to the utility of using emulsions for immunologic purposes. The physical makeup of the emulsion demonstrates the uniqueness of this approach, because each globule or particle of the dispersed phase is surrounded by oil. Before the aqueous phase is reached at the site of injection of the emulsion, the oil must be removed by metabolism or by phagocytosis, thus the RES is being stimulated in all likelihood just prior to the time that the antigen is absorbed. Thus a double-barreled effect is created, with the result that the oil cooperates or synergizes with the antigen. This unique effect may not be observed if the emulsion is not stable, because at the site of injection the antigen and oil are being absorbed simultaneously. It is very desirable to have the RES stimulated first, because the immunologic response is far greater to a specific antigen for the development of specific immunity.

To derive the maximum benefit of having the RES stimulated before attempting to establish specific immunity, an injection of lipopolysaccharide such as bacterial endotoxins or zymosan from yeast, etc., could be employed before administering the antigen. The parenteral injection for stimulation of the RES can be made about 2 to 6 days prior to the injection for developing specific immunity.

The aqueous phase of the emulsion includes water, and the antigen, with or without the non-toxic polyvalent metal cation mentioned previously. As to the source of the polyvalent metal cation, generally ionizable salts are employed, and these may be salts of such metals as calcium, magnesium, aluminum, zinc, copper, iron, cobalt, nickel, mercury, etc. The metal salts may be, for example, chlorides, nitrates, sulfates, acetates, benzoates, bitartrate, biphosphate, borate, bromide, butyrate, carbonate, citrate, hydroxide, iodide, isobutyrate, isovalerate, lactate, linolate, malate, randalate, oleate, oxalate, phosphate, propionate, salicylate, stearate, succinate, tartrate, etc. Specific examples are nickel acetate, cupric acetate, magnesium benzoate, magnesium biphosphate, aluminum borate, ferric bromide, ferric calcium butyrate, ferric citrate, magnesiumcitrate, cobalt citrate, aluminum hydroxide, ferrous iodide, cupric oleate, ferrous phosphate, magnesium phosphate, calcium propionate, mercuric salicylate, mercuric stearate, ferric tartrate, cupric tartrate, etc.

The polyvalent metal ionic material may also service as an indicating material for determining by spot testing the state of emulsification of the final composition. By virtue of the metal salt being dispersed properly in the emulsion, it cannot be detected by standard procedures of spot testing. But, if the dispersed phase should agglomerate or the emulsion is not made properly, then the uncombined metal salt will readily react with a suitable analytical reagent to produce a colored product. Specific combinations of metal salt and reagent are, for example, aluminum chloride and other aluminum salts with alizarin or quinalizarin; calcium nitrate or other calcium salts with dihydroxy tartaric acid osazone or glyoxalbis (2-hydroxyanil); copper nitrate or copper sulfate with o-toldine and ammonium thiocyanate or rubeanic acid or alizarine blue or diphenyl carbazone, or zinc diethyl dithiocarbamate; ferric chloride or other iron salts with potassium ferrocyanide or ammonium thiocyanate or potassium thiocyanate or ,'-dipyridyl or disodium-1, 2 dihydroxy benzene-3, 5 disulfonate; magnesium chloride or magnesium nitrate with quinalizarin; mercuric chloride or mercuric nitrate with cuprous iodide; zinc nitrate or zinc chloride with potassium ferricyanide and p-phenetidine; cobalt nitrate with chromatropic acid dioxime or sodium pentacyano piperidine ferroate; nickel nitrate or chloride with dimethyl glyoxime or rubeanic acid; etc.

Since the metal salts can be detected in very minute concentrations, for example, 1 part of metal salt in 200,000–5,000,000 parts of water, it is not necessary to have a large quantity to be detected. Generally, the metal salts may be present in the final composition in such small concentrations as about 1 to 5 parts per million (abbreviated "ppm"). The metal salt may be as high as 5,000 ppm or even higher; however, it is desirable to maintain the amount as low as possible and yet be consistent with good detection. Usually, about 100 to 3,000 ppm of metal salt will serve to provide good detection. The method of detecting the metal salts is described in Feigl's book entitled "Spot Tests in Inorganic Analysis," 5th edition, Elsevier Publishing Co., New York, 1958, and such disclosure is hereby incorporated by reference. One excellent method of detection for ferric chloride is to saturate filter paper with potassium ferrocyanide (0.02 normal) and then add a drop of the final composition to the paper. If the characteristic blue color does not appear immediately, then it can be said that the composition is safe for use. Ammonium thiocyanate is 2 percent solution may be used instead of potassium ferrocyanide, giving a characteristic rusty or brown reaction product with the ferric ion.

The dispersed phase of the dispersion or emulsion is comprised of particles or globules having an average size of about 0.1 to 10 microns. The size of particle of globule will determine to some extent the stability of the dispersion or emulsion. Consequently, for relatively stable dispersions or emulsions, the average particle or globule size is about 0.1 to 2 microns, whereas, for relatively faster rates of release, the average size may be about 2 to 10 microns. By virtue of having the particles or globules surrounded by an oily medium, the antigen is released for absorption at a rate dependent upon the rate of oil absorption or metabolization. Consequently, in the present invention, there is an interplay of several factors which causes a slow and substantially constant rate of release and slow absorption of antigen, namely, (1) the stability of the emulsion or dispersion, and (2) the rate of absorption or metabolization os the oil material.

The dispersed phase of the emulsion may also contain an additional indicating material which serves to designate the state of emulsification. The additional indicating material may be a non-toxic dye or pigment. Such an indicating material must not be soluble in the oil phase, but should be soluble in the dispersed aqueous phase. The chemical nature of the indicator is not material, i.e., it can be any organic or inorganic material, but the concentration in which it is used must not be toxic to the subject being inoculated.

Various dyes, such as the aeridine dyes, azo dyes, indigoid dyes, pthalein dyes, triphenylmethane dyes, etc., can be used. Specific examples of the medicinal dyes are acriflavine, methylene blue, Congo red, Evan's blue, scarlet red, indigo, tyrian purple, fluroscein, indopthalein, merbromin, phenolpthalein, phenolsulphonthalein, sulfobromothalein, fuchsin, methyl rosanaline, etc. Specific examples of the F. D. & C. certified dyes, are blue No. 1 (brillant blue), blue No. 2 (indigo carmine), green No. 1 (guinea green), green No. 2 (light green S F yellowish), green No. 3 (fast green FCF), orange No. 1 (orange I), red No. 1 (ponceau 3R), red No. 2 (amaranth), red No. 3 (erythrosine), red No. 4 (ponceau 5X), yellow No. 1 (naphthol yellow), yellow No. 2 (naphthol yellow K salt), yellow No. 5 (tetrazine), yellow No. 6 (sunset yellow FCF), etc. The indicating material may also be an indicator which produces color at a given pH level. If the pH of the emulsion does not cause the indicator to be colored, then the state of emulsification can be determined by having some of the emulsion containing the indicator contact filter paper or the like saturated with an acid or base, as the case may be. If the emulsion is proper, color will not appear immediately, even though the indicator would normally be colored upon contacting the acid or base. Specific examples of the indicators are:

| | |
|---|---|
| Methyl Violet 6B | Methyl Red |
| Metacresol Purple | Chlorphenol Red |
| Metanil Yellow | Bromcresol Purple |
| p-Xyelenol Blue | Alizarin |
| Thymol Blue | Dibromphenoltetrabrom- |
| Tropaeolin 00 | phenolsulfonthalein |
| Quinaldine Red | Bromthymol Blue |
| Benzopurpurine 4B | Indo-oxine |
| 2-4 Dinitrophenol | Phenol Red (Phenosul- |
| Methyl Yellow | fonthalein) |
| Bromphenol Blue | Neutral Red |
| Tetrabrom phenol Blue | Cresol Red |
| Direct Purple | Metacresol Purple |

| | |
|---|---|
| Congo Red | Tropaeolin 000 No. 1 |
| Methyl Orange | Phalpthalein |
| Brom-chlorphenol Blue | Nile Blue A |
| Sodium alizarin sulfonate | Alizarin Yellow G.G. |
| Bromcresol Green | Alizarin Yellow R |
| | Tropaeolin 0 |

The indicating material may comprise from about .00001 to 0.5 percent, more usually about 0.00001 to 0.005 percent, by weight of the dispersed phase. At relatively low concentrations, an emulsion containing the dispersed phase of globules of less than about 10 microns, particularly less than 2 microns, will give little or no evidence of color. If color is apparent, it is present uniformly throughout the emulsion, making no distinction that it is actually present only in the dispersed phase. When the globules grow larger in size, through cracking of the emulsion, color will reappear. It has also been found, quite unexpectedly, that some indicating materials, when they are surface active, such as, for example, amaranth and phenolsulfothalein, promote emulsification and/or stabilization of the emulsion.

It has also been observed that the combination of a surface active indicating material, such as, for example, amaranth and/or phenolsulfopthalein, with the non-colored indicating material or metal salt, such as, for example, the ferric salt, e.g., ferric chloride, promotes emulsification and stabilizes the emulsion beyond what would be expected from their individual effects. For reasons not clearly understood, these materials synergize to give an improvement which is not forseeable on the basis of their expected properties. The relative amounts of the two indicating materials may vary within the ranges given hereinabove for each type.

Aside from the emulsifying effect which is obtained from the indicating material, it is also contemplated to employ an emulsifying agent or agents for this type of emulsion. The emulsifying agent must be non-toxic when used in the amounts at which emulsification is produced. Various classes of emulsifiers may be used for this invention including such materials as a partial ester of a polyhydric alcohol and a fatty acid, a glycolether, long chain fatty alcoholpolyoxyethylene, long chain fatty acid polyoxyethylene, a partial ester of a fatty acid and a polyhydric alcohol condensed with ethylene oxide, etc. All the emulsifiers are either amohoteric or non-ionic in character. The partial esters usually contain at least two free hydroxyl groups; consequently, they are derived from polyhydric alcohols containing at least three hydroxyl groups. These alcohols may contain as high as 12 hydroxyl groups, although usually those containing up to six hydroxyl groups are used more often. The fatty acid, employed to esterify part of the hydroxyl groups, may contain about eight to 24 carbon atoms, more usually about 12 to 18 carbon atoms. The polyhydric alcohols are, for example, glycerol, pentaerythritol, mannitol, etc. The fatty acids are, for example, lauric acid, oleic acid, stearic acid, octanoic acid, etc. Specific examples of such emulsifiers are mannide mono-oleate, glyceryl mono-oleate, mannitol mono-oleate, glycerol mono-oleate, pentaertyritol mono-laurate, glucose dioctanoate, etc. The glycol ethers are derived from alkylene glycol and a long chain fatty alcohol, e.g., those containing about 12 to 24 carbon atoms in the alcohol molecule. The glycol ethers may have the formula:

$$\mathrm{R{-}\underset{\displaystyle \mathrm{OH}}{\underset{|}{C}H}{-}CH{-}O{-}R'}$$

wherein R may be an alkyl group of about 24 carbon atoms or hydrogen or a hydroxy substituted alkylene group, or hydroxy substituted alkyl group, and R′ may be an alkyl group of about 12 to 24 carbon atoms. The condensate of ethylene oxide and a fatty alcohol may be represented by the following formula:

$$RO - (CH_2CH_2{-}0)_n{-}OH$$

wherein R is an alkyl group containing about 12 to 24 carbon atoms and "$n$" is an integer ranging from about 10 to 40. The condensate of ethylene oxide and a fatty acid may be represented as follows:

$$RCO\,(CH_2{-}CH_20)_n{-}OH$$

wherein R is an alkyl group containing from about 8 to 24 carbon atoms, preferably 12 to 18 carbon atoms and "$n$" is an integer of 10 to 40.

The emulsifier is usually employed in an amount of about 1 to 15 percent by volume based on the dispersed phase. The amount of emulsifier employed may vary with the type of emulsifier being used. All emulsifiers are not equivalent in their effectiveness; i.e., some are better than others.

It has also been found that the combination of a partial ester containing five free hydroxyl groups, such as mannitol mono-oleate, with a partial ester containing two free hydroxyl groups, such as glycerol mono-oleate, produces an unusually effective combination of emulsifiers, as evident from the longer stability of the emulsion upon standing and from the fact the emulsion is obtained faster. Generally, about 1 to 10 parts by volume of the partial ester containing five free hydroxyl groups are admixed with 1 to 10 parts by volume of the partial ester containing two free hydroxyl groups.

The microorganism to be emulsified can be alive, modified, attenuated and/or killed. The microorganism can be bacterial, viral and/or rickettsial. Specific examples of microorganisms are poliomyelitis virus, measles virus, yellow fever virus, influenza viruses, adeno viruses, common cold viruses, black leg virus, hog cholera virus, renderpest virus, fowl pow virus, newcastle virus, distemper virus, infectius canine hepatitis, coryne bacterium diptheriae, clostridium tetani, hemophilus pertussis, mycobacterium tuberculosis, brucella, bacterium tulerense, salmonella paratyphosa, salmonella typhosa, cholera vibrio, mocrococcus pyogenes var. aureus (staphylococcus), streptococcus, etc. The microorganisms may be used singly in the emulsions or in various combinations of two or more of the same. For example any two or more of microorganisms which are responsible for diptheria, tetanus, pertussis, polio and measles. Similarly, adeno and cold viruses may be combined.

By utilizing the microorganisms in emulsion form several important advantages are realized, through the delayed absorption, namely, less material is required of the vaccine, longer or prolonged immunity is induced, less untoward or unfavorable reactions are encountered and the immunity approximates natural immunity to a greater extent than has been possible by vaccines heretofore.

The oil portion of the emulsion may vary considerably in amount relative to the aqueous phase. In general, the aqueous phase may comprise about 0.1 to 2.5 parts by volume per part by volume of oil. In the case of emulsions made with vegetable oils, the aqueous phase is preferably about 0.1 to 1.5 parts by volume per part of oil. The single hydrocarbons are preferably emulsified with relatively larger quantities of aqueous material, namely, about 0.5 to 2.5 parts by volume of aqueous phase per part of oil.

The preparation of the emulsion may involve combining an emulsifier or a combination of emulsifiers with the oil, adding the antigen and indicator to the aqueous material and then combining the two resultant phases to produce the emulsion. The emulsion can be obtained by various techniques, such as by mechanical shaking at speeds of about 2,000 rpm and higher, by ultra-sonics, by a colloid mill, by stirring and/or by a double syringe method involving two syringes which are interconnected by a double-hubbed needle, the size of which is small enough to produce the desired shearing action. The method to be used may be governed by the particle size desired and the factor of maintaining sterility.

The following examples provide a better understanding of the present invention.

EXAMPLE III

| | | |
|---|---|---|
| Influenza Vaccine Polyvalent | | 1cc |
| n-hexadecane (.88 part) | ) | |
| Mannide mono-oleate (.1 part) | ) | 1cc |
| Glyceryl mono-oleate (.02 part) | ) | |
| Particle size (average) | | 0.5-1.0u |

EXAMPLE IV

| | | |
|---|---|---|
| Influenza Vaccine (Types A and B) | | 1cc |
| Mannide mono-oleate (0.1 part) | ) | |
| n-hexadecane (0.88 part) | ) | 2cc |
| Glyceryl mono-oleate (0.02 part) | ) | |
| $FeCl_3$ (10% solution) | | 0.1cc |

The stability of the emulsion shown in Example IV was remarkably better than an emulsion which did not contain $FeCl_3$.

EXAMPLE V

| | | |
|---|---|---|
| Killed Polio Vaccine (Types 1, 2 and 3 USPH Standards) | | 2cc |
| n-hexadecane (0.88 part) | ) | |
| Mannide mono-oleate (0.06 part) | ) | 1cc |
| Glyceryl mono-oleate (0.06 part) | ) | |

EXAMPLE VI

| | | |
|---|---|---|
| Live measles virus* (1:10 dilution) | | 1cc |
| n-hexadecane (0.88 part) | ) | |
| Mannide mono-oleate (0.06 part) | ) | 0.5cc |
| Glyceryl mono-oleate (0.06 part) | ) | |

*Attenuated in accordance with procedure of Frankell et al Fed. Proc., Vol. 17, page 551 (1958)

The aforementioned formulas and the emulsions of this invention are useful for developing immunity, and in particular, they can be used in mammals such as, for example, mice, rabbits, monkeys, rats, guinea pigs, dogs, etc. to ascertain the effects of various microorganisms in developing specific and non-specific immunologic responses.

Although the foregoing discussion has been directed to the use of a single hydrocarbon oil adjuvant, included within the scope of each embodiment is the use of such hydrocarbons in admixture with a suitable vegetable oil, or other suitable metabolizable non-hydrocarbon oil. In many cases, such admixtures are preferred because of the extremely low incidence of tissue irritation exhibited thereby, upon parenteral administration. Varying mixture proportions can be used depending upon the nature of the desired emulsion. These mixtures can be produced in various ways. For example, the vegetable oil and metabolizable hydrocarbon e.g. n-hexadecane, can be mixed with suitable amounts of an emulsifier. In general, the emulsion is made with n-hexadecane and the vegetable oil, together with its emulsifier, is used to dilute the outer oily phase. Various proportions of each can be used to bring about a desired effect. Or, separate emulsions can be made, each containing the active ingredient, and thereafter mixed in suitable proportions. This latter technique permits some of the material to be absorbed more quickly via the vegetable oil, while the agent admixed with the hydrocarbon is absorbed more slowly.

Another embodiment of this invention is a method for enhancing the adjuvant effect of vegetable oil emulsions, which comprises adding to these emulsions increasing concentrations of n-hexadecane or the other emulsion oils of this invention. The following example more fully demonstrates this embodiment.

EXAMPLE VII

To a mixture of 0.88 part n-hexadecane, 0.1 part mannide mono-oleate and 0.02 part glyceryl mono-oleate is added 2-3 ml. influenza polyvalant vaccine in a peanut oil emulsion comprising 0.88 part peanut oil, 0.1 part mannide mono-oleate and 0.02 part glyceryl mono-oleate. This emulsion, upon subcutaneous administration to a mouse, favorably modifies the inflammatory response and yet produces enhanced anti-body protection, since comparable vegetable oils are such poor adjuvants and this is overcome by the added n-hexadecane.

What is claimed is:

1. In a method for prolonging repository effect immunity or therapy induced by an oil-insoluble medicament in a mammal which comprises: administering parenterally to such mammal an injectable, stable, homogeneous w/o emulsion; said emulsion comprising 0.1 to 2.5 parts by volume, per part of oil phase emulsified with mannide mono-oleate and glycerol monoleate, of an aqueous dispersed phase containing a water-soluble color indicator designating the state of emulsificiation and the prolonged repository effect immunity-inducing or therapy-inducing oil-insoluble medicament dispersed as globules or particles substantially uniformly through an oil phase selected from the group consisting of animal, vegetable, and a hydrocarbon containing about 12–18 carbon atoms, the improvement comprising the step of effecting a slow and substantially constant rate of release and slow absorption thereof of said globules of aqueous dispersed phase by virtue of having each globule prepared and determined by color indicator to have an average particle size of about 0.1 to 10 microns.

2. A method of inducing non-specific resistance in a mammal by the parenteral administration of the emulsion of claim 1 in which the medicament is a lipopolysaccharide.

3. A method for increasing the $LD_{50}$ of a toxic medicament in a mammal by the parenteral administration to said mammal of the emulsion of claim 1.

4. A method for producing resistance of a fetus or neonate of a mammal to radiation by parenteral administration to the female mammal carrying said fetus or neonate the emulsion of claim 2.

5. A method for producing specific immunity in a mammal by the parenteral administration of the emulsion of claim 1 in which the medicament is selected from the group consisting of live virulent and attenuated microorganisms which produces the disease against which immunity is sought and the killed microorganisms of the same.

6. The method of claim 1 wherein emulsion is further characterized by having included therewith about 0.5 to 0.1 ml. of a 10 percent by weight solution of ferric chloride and the medicament is an allergen used therapeutically, said allergen being an inhalant, mold, epidermal, pollen, or house dust extract allergen.

* * * * *